United States Patent [19]

Cusick et al.

[11] Patent Number: 5,785,725
[45] Date of Patent: Jul. 28, 1998

[54] POLYMERIC FIBER AND GLASS FIBER COMPOSITE FILTER MEDIA

[75] Inventors: Michael John Cusick, Englewood; Fred Lee Jackson, Littleton, both of Colo.; Charles F. Kern, Marietta, Ohio

[73] Assignee: Johns Manville International, Inc., Denver, Colo.

[21] Appl. No.: 837,185

[22] Filed: Apr. 14, 1997

[51] Int. Cl.$^6$ ............................ B01D 39/16; B01D 39/20
[52] U.S. Cl. ............................ 55/382; 55/486; 55/487; 55/527; 55/528; 210/488; 210/492; 210/509; 442/390
[58] Field of Search ............................ 55/486, 487, 382, 55/527, 526, 524, 522; 210/483, 488, 491, 492, 506, 508, 509; 442/390, 381, 373; 428/319.1, 315.9

[56] References Cited

U.S. PATENT DOCUMENTS

| | | | |
|---|---|---|---|
| 4,188,197 | 2/1980 | Amberkar et al. | 55/487 |
| 4,324,574 | 4/1982 | Fagan | 55/528 |
| 4,522,876 | 6/1985 | Hiers | 55/486 |
| 4,728,349 | 3/1988 | Oshitari | 55/487 |
| 4,877,433 | 10/1989 | Oshitari | 55/487 |
| 4,961,974 | 10/1990 | Jones | 55/528 |
| 4,983,193 | 1/1991 | Tani et al. | 55/487 |
| 5,283,106 | 2/1994 | Seiler et al. | 55/528 |
| 5,389,121 | 2/1995 | Pfeffer | 55/487 |
| 5,472,467 | 12/1995 | Pfeffer | 55/527 |
| 5,480,466 | 1/1996 | Jackson et al. | 55/528 |
| 5,588,976 | 12/1996 | Miller | 55/527 |
| 5,607,491 | 3/1997 | Jackson et al. | 55/528 |
| 5,607,735 | 3/1997 | Brown | 55/528 |
| 5,630,856 | 5/1997 | Pfeffer | 55/488 |
| 5,634,954 | 6/1997 | Kern | 55/487 |

*Primary Examiner*—Duane Smith
*Attorney, Agent, or Firm*—Robert D. Touslee

[57] ABSTRACT

A composite filter media for bag or pocket filters and the like includes an upstream dirt-holding layer of fine polymeric fibers and a downstream high efficiency filtration layer of glass fibers. The upstream layer includes polymeric microfibers having a mean fiber diameter ranging from about 2.5 to about 4.5 microns, lofting fibers and binder fibers; and weighs between about 2.0 and about 7.0 grams per square foot. The glass fiber layer has a weight between about 1.2 and about 2.7 grams per square foot; the average diameter of the fibers in the glass fiber layer is within a range from $3.0 \times 10^{-5}$ to $4.1 \times 10^{-5}$ inches; and the fibers are bonded together at their points of intersection with a binder. The composite filter media has an average air filtration efficiency of at least 80%.

36 Claims, 1 Drawing Sheet

POLYMERIC FIBER AND GLASS FIBER COMPOSITE FILTER MEDIA

BACKGROUND OF THE INVENTION

The present invention relates to composite filter media and in particular to filtration media including a fine polymeric fiber upstream layer which exhibits a superior, unexpected dirt holding capacity in combination with a downstream glass fiber filtration layer.

Filtration media typically include upstream layers made up of relatively coarse diameter fibers to provide the filtration media with increased dirt-holding capacity and downstream layers made up of relatively fine diameter fibers to provide the filtration media with the desired filtration efficiencies. The upstream layer of coarse fibers captures and retains the coarser particles in the gas or other fluid stream being filtered so that these coarser particles do not prematurely clog the finer openings in the denser fine fiber filtration layer and thereby shorten the service life of the filtration media.

During the development of a composite filter media of this general type, four different composite filter media test samples were made for evaluation. A first composite filter media had a downstream filtration layer made of relatively fine glass fibers and an upstream dirt-holding layer made of relatively coarse glass fibers. A second composite filter media had a downstream filtration layer made of relatively fine glass fibers and an upstream dirt-holding layer made of relatively fine glass fibers. A third composite filter media had a downstream filtration layer made of relatively fine glass fibers and an upstream dirt-holding layer made of relatively coarse polymeric fibers. A fourth composite filter media had a downstream filtration layer made of relatively fine glass fibers and an upstream dirt-holding layer made of relatively fine polymeric fibers. When tested by the flat sheet testing method described in detail below, the first composite filter media had a dirt-holding capacity of 19 gm/4 ft$^2$; the second composite filter media had a dirt-holding capacity of 22 gm/4 ft$^2$; the third composite filter media had a dirt-holding capacity of 11 gm/4 ft$^2$; and the fourth composite filter media had a dirt-holding capacity of 13 gm/4 ft$^2$. From these tests, it appeared that the third and fourth composite filter media with the dirt-holding layers made of polymeric fibers did not provide the dirt-holding capacity required for the product. However, rather than abandon the concept of using upstream polymeric fiber dirt-holding layers in the composite filter, it was decided to make pocket filters out of the third and fourth composite filter media for further testing.

Due to processing problems, a pocket filter could not be made from the third composite filter media test sample with the coarse polymeric fiber dirt-holding layer. The composite filter media did not withstand the processing and sewing required to form a pocket filter. However, the fourth composite filter media test sample with the fine polymeric fiber dirt-holding layer was formed into a pocket filter and tested. In the tests, the pocket filter made with the forth composite filter media (fine polymeric fiber dirt-holding layer and fine glass fiber filtration layer) exhibited a dirt-holding capacity of 797 grams, which is equivalent to a dirt-holding capacity of 38 gm/4 ft$^2$ in the flat sheet test described below. This dirt-holding capacity was 25 gm/4 ft$^2$ higher than the 13 gm/4 ft$^2$ dirt-holding capacity obtained in the flat sheet test. This was an unexpected result, especially, when compared to the second composite media test sample, which showed a 22 gm/4 ft$^2$ dirt-holding capacity in the flat sheet test, and only exhibited a dirt-holding capacity of 570 grams as a pocket filter.

It is believed that, in actual use, the fluid (e.g. air) being filtered through a filter typically may have major stream components which do not pass through the filter in a direction normal to the major upstream surface of the filter. The flat sheet test, used to evaluate the various test samples, passes air through the filter media in a direction normal to the upstream surface of the filter media test sample. With the fluid being filtered having major stream components passing through the filter at acute angles to the upstream major surface of the filter, the dirt-holding capacity may be changed and in this case the results were much more favorable than expected from the results of the flat sheet test.

SUMMARY OF THE INVENTION

The composite fibrous filtration media of the present invention includes an upstream layer of fine polymeric fibers for enhancing the dirt holding capacity of the filtration media and a downstream glass fiber blanket filtration layer for enhancing the filtration efficiency of the filtration media.

The upstream layer includes about 10% to about 60% by weight polymeric microfibers having a mean fiber diameter between about 2.5 and about 4.5 microns, about 25% to about 60% by weight polymeric loft fibers having a mean fiber diameter between about 4 and about 14 denier, and about 15% to about 30% by weight polymeric binder fibers having a mean diameter between about 2 and about 4 denier. The initial pressure drop across the upstream polymeric fiber layer is less than about 0.05 inches of water column and the average air filtration efficiency of the polymeric fiber layer is less than about 20%. Preferably, the polymeric loft fibers are crimped to provide more loft.

The downstream layer is a fibrous blanket, preferably, made up of flame attenuated glass fibers which are bonded together at their intersections with a binder. The blanket weighs between about 1.2 and about 2.7 grams per square foot and the average diameter of the fibers in the blanket ranges from about 3.0×10$^{-5}$ to about 4.1×10$^{-5}$ inches. The blanket and the scrim or backing layer, together, range in weight from about 2.5 to about 4.0 grams per square foot. The fibrous blanket and the scrim or backing layer have a combined average air filtration efficiency ranging from at least 80% to about 95% and the initial pressure drop across the thickness of the blanket and the backing layer ranges from no greater than 0.15 inches of water and preferably no greater than 0.12 inches of water at the lower efficiency levels to no greater than 0.35 inches of water and preferably no greater than 0.25 inches of water at the higher efficiency levels.

In one embodiment of the composite filtration media, the fibrous blanket is made of fibers having an average fiber diameter between about 3.3×10$^{-5}$ and 4.1×10$^{-5}$ inches. The blanket weighs between about 1.2 and about 2.2 grams per square foot and is substantially uniform in density and thickness throughout. The blanket and the scrim or backing layer, together, weigh between about 2.5 and about 3.5 grams per square foot and have a combined average air filtration efficiency of at least 80% and preferably about 85%. The initial pressure drop across the blanket and the backing layer is no greater than 0.15 inches of water and preferably, no greater than 0.12 inches of water. Preferably, the blanket and the backing layer, together, range in thickness from about 0.08 to about 0.12 inches.

In another higher efficiency embodiment of the composite filtration media, the fibrous blanket is made of fibers having an average fiber diameter between about 3.0×10$^{-5}$ and about 3.7×10$^{-5}$ inches. The blanket weighs between about 1.7 and about 2.7 grams per square foot and is substantially uniform in density and thickness throughout. The blanket and the scrim or backing layer, together, weigh between about 3.0 and 4.0 grams per square foot and have a combined average air filtration efficiency of at least 90% and preferably about 95%. The initial pressure drop across the blanket and the backing layer is no greater than 0.35 inches of water and preferably, no greater than 0.25 inches of water. Preferably, the blanket and the backing layer, together, range in thickness from about 0.08 to about 0.12 inches.

DESCRIPTION OF THE PREFERRED EMBODIMENTS

Figure 1:
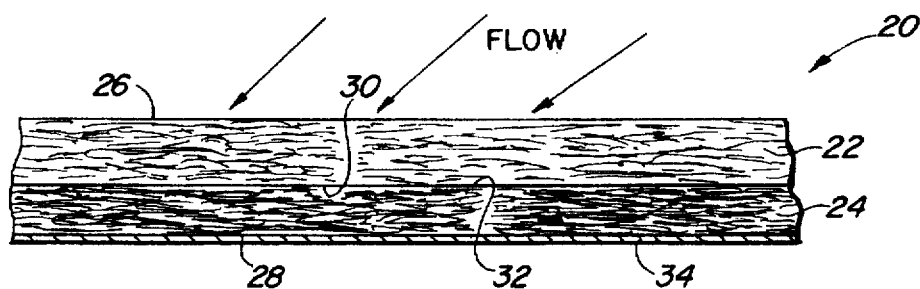
FIG. 1 is a cross section through the composite filtration media of the present invention.

As shown in FIG. 1, the composite filter media 20 of the present invention includes an upstream layer 22 of polymeric fibers and a downstream layer 24 of glass fibers. The gas being filtered passes into the composite filter media 20 through a major upstream surface 26 of the upstream layer 22 and exits the composite filter media 20 through a major downstream surface 28 of the downstream layer 24. A major downstream surface 30 of the upstream layer 22 and a major upstream surface 32 of the downstream layer 24 are preferably bonded or otherwise secured together.

The upstream layer 22 of polymeric fibers includes about 10% to about 60% by weight polymeric microfibers having a mean fiber diameter between about 2.5 and about 4.5 microns, about 25% to about 60% by weight polymeric loft fibers having a mean fiber diameter between about 4 and about 14 denier, and about 15% to about 30% by weight polymeric binder fibers having a mean diameter between about 2 and about 4 denier. The percentage by weight of the polymeric loft fibers to the polymeric binder fibers is preferably about two to one. In a preferred embodiment, the upstream layer includes by weight about 40% polymeric microfibers, about 40% polymeric loft fibers, and about 20% polymeric binder fibers. In one preferred embodiment, the polymeric microfibers have a mean diameter of about 3.5 microns; the polymeric loft fibers have a mean diameter of about 6 denier; and the polymeric binder fibers have a mean diameter of about 3 denier.

The polymeric microfibers are preferably made of a polymeric material such as polypropylene, but may be made of other polymeric materials, including but not limited to, polyester, polyolefin, and polyphenylene sulfide. The loft fibers are preferably polymeric fibers made of polyester, but may be made of other polymeric materials, including but not limited to, polypropylene and polyolefin. While not preferred, the loft fibers can also be made of natural fibers or other synthetic fibers. To enhance the lofting of the upstream layer 22 and thus the dirt holding capacity of the upstream layer 22, the polymeric loft fibers can be crimped. Preferably, the loft fibers have between about 10 and about 20 crimps per inch and most preferably about 15 crimps per inch. The binder fibers are preferably made with a polyester core and a polyolefin sheath, but may be made of other polymeric materials provided the softening point temperature of the binder fibers or the outer sheath of the binder fibers, where composite fibers are used, is less than the softening point temperatures of the polymeric microfibers and loft fibers. Since the softening point temperature of the polymeric binder fibers is lower than the softening point temperatures of the polymeric microfibers and the lofting fibers, by heating the blanket or mat of polymeric fibers to a temperature where the surfaces of the binder fibers become tacky and then cooling the blanket or mat, the polymeric fibers of the blanket or mat are bonded together at their points of intersection and the blanket is bonded to any adjacent layers of the filter media.

The upstream layer 22 preferably has a weight between about 2.0 and about 7.0 grams per square foot and is most preferably about 5.0 grams per square foot. The initial pressure drop across the upstream layer from one major surface to the other major surface is about 0.05 inches of water column or less. The average air filtration efficiency of the upstream layer 22 is preferably between about 5% and 20%.

Preferably, the fibrous blanket forming the downstream layer 24 of the composite filtration media 20 is about 0.08 to about 0.12 inches thick; substantially uniform in density and thickness throughout; and essentially free of macroscopic voids which would permit portions of an air or gas stream to pass through the blanket essentially unfiltered. With its substantially uniform density and thickness, the blanket provides consistent or substantially consistent filtration performance over its entire surface area.

The blanket is formed of fibers which are preferably bonded together at their points of intersection with a binder. The average diameter of the fibers forming the blanket ranges from $3.0 \times 10^{-5}$ to $4.1 \times 10^{-5}$ inches. Fibers having an average diameter less than $3.0 \times 10^{-5}$ inches are too short and fragile to provide the blanket with the integrity required for most applications. Fibers having an average diameter over $4.1 \times 10^{-5}$ inches are to large in diameter to provide the required average air filtration efficiencies at the low blanket weights of the composite filtration media 20 of the present invention.

The preferred fibers for the blanket of the downstream layer 24 are flame attenuated glass fibers. These fibers are formed by drawing continuous primary glass filaments from a conventional feeder or pot and introducing these continuous primary glass filaments into the high energy gaseous blast of a flame attenuation burner, e.g. a Selas burner, where the continuous filaments are reheated, attenuated and formed into fine diameter staple or finite length glass fibers of the desired diameter within the aforementioned diameter range. A binder is then sprayed onto the finite length fibers and the fibers are collected to form the blanket, e.g. on a moving chain, collection conveyor. Typically, the blanket is collected on a permeable backing sheet 34 carried on the collection conveyor. The permeable backing sheet 34, when used, facilitates the handling of the blanket, increases the integrity of the blanket, and, as shown in FIG. 1, becomes part of the finished product. Preferably, the blanket, with or without a permeable backing sheet 34, is then passed between sear rolls which at least partially cure the binder in the blanket. The sear rolls are spaced apart a selected distance to set the thickness of the blanket.

While flame attenuated glass fibers are preferred, other fibers may be used to form the blanket of the downstream layer 24, such as glass fibers produced on rotary fiberization processes and polymeric fibers. The fiber diameters set forth in this specification are measured by a micronaire flow resistance test.

The binder used to bond the fibers of the blanket of the downstream layer 24 is typically a phenolic binder.

However, undyed phenolic binders, when cured, give the blanket a yellow or tan appearance. To give the blanket a white appearance and to reduce volatile emissions during the manufacturing process, acrylic latex binders, ethyl vinyl acetate binders, and styrene butadiene binders can be used to bond the fibers of the blanket together. Preferably, the binder is between about 10% and about 25% by weight of the total weight of the blanket.

As discussed above, when used, the permeable backing sheet 34 increases the integrity of the composite filtration media 20 by reinforcing the blanket, but adds little or nothing to the filtration efficiency or dirt holding capacity of the composite filtration media. The backing sheet 34 is a permeable sheet, such as, but not limited to, a light weight (e.g. 0.4–0.5 oz. per square yard), non-woven, open mesh scrim of polyester, nylon, glass or similar materials.

The blankets of the downstream layer 24 of the composite filtration media 20 range in weight from about 1.2 to about 2.7 grams per square foot. The blankets 24 and the backing sheets 34 which typically weigh about 1.3 grams per square foot, together, range in weight from about 2.5 to about 4.0 grams per square foot and have an initial pressure drop across their thickness preferably from no greater than 0.12 inches of water column at the lower weights and lower average air filtration efficiencies to, preferably, no greater than 0.35 inches of water column at the higher weights and higher average air filtration efficiencies. The initial pressure drops across the blankets 24 are measured before any dust loading of the blankets. The average air filtration efficiencies of the blankets 24 of the composite filtration media 20 of the present invention range from at least 80% for the lighter weight and coarser fiber blankets up to about 95% for the heavier weight and finer fiber blankets.

The efficiency ratings given to the blankets forming the upstream and downstream layers 22 and 24 of the composite filtration media 20 of the present invention are based on the following flat sheet testing procedure. An air stream, with 0.3 to 0.5 micron mineral oil droplets, is passed through a four square foot section of the blanket at 100 cubic feet per minute. The number of droplets in the air stream, upstream of the blanket, is compared to the number of droplets in the air stream, downstream of the blanket, to determine the efficiency. The initial efficiency rating for the blanket is the efficiency measured at the beginning of the test run with no dust loading.

During the testing procedure, dust particles are added to the blanket section by passing an air stream containing the dust particles through a four square foot section of the blanket at 100 cubic feet per minute. When the pressure drop across the blanket reaches one inch of water column, the blanket is considered plugged and the test is completed. The average air filtration efficiency rating for the blanket is an average of the measured air filtration efficiencies of the blanket as measured when the pressure drop across the blanket reaches certain levels during the test. The efficiency measurements made to determine the average air filtration efficiency of the blanket are made: at the beginning of the test, at the end of the test (when the pressure drop across the blanket is one inch of water column), and when the dust loading of the blanket causes the pressure drops, across the blanket, to be at the following levels: 25%, 50% and 75% of the way between the initial pressure drop across the blanket and the final pressure drop across the blanket of one inch of water column. This average efficiency rating is referred to in this specification as the "average air filtration efficiency".

This efficiency measurement is based on the mechanical trapping of dust particles by the blanket and is not based on efficiencies which can be obtained, with certain filtration media, by means of an electrostatic charge on the fibers of the filtration media attracting and capturing charged dust particles present in an air or gas stream or by applying tackifiers, such as oils, to the fibers of the blanket to which dust particles in the air or gas stream adhere. The "dirt-holding capacity" of a blanket is the weight of dust particles, in grams, that causes the two foot square section of blanket being tested to have a one inch of water column pressure drop across its thickness.

The thicknesses of the blankets set forth in this specification are measured by placing a one foot square 630 gram weight on a one foot square section of blanket and measuring the thickness of the blanket when compressed by the weight.

In one high efficiency embodiment of the present invention, the fibrous blanket 24 is made of fibers (preferably flame attenuated glass fibers) having an average diameter between $3.3 \times 10^{-5}$ and $4.1 \times 10^{-5}$ inches. The blanket weighs between about 1.2 and about 2.2 grams per square foot and is substantially uniform in density and thickness throughout. The blanket 24 and the backing layer 34 which weighs about 1.3 grams per square foot, together, weigh between about 2.5 and about 3.5 grams per square foot and have an average air filtration efficiency of at least 80% and preferably, about 85%. The initial pressure drop across the thickness of the blanket 24 and the backing layer 34 is no greater than 0.15 inches of water and preferably, no greater than 0.12 inches of water. Preferably, the blanket 24 and the backing layer 34, together, range in thickness from about 0.08 to about 0.12 inches and typically, have a combined dirt-holding capacity of about 10 to about 12 grams/4 ft$^2$.

In the highest efficiency embodiment of the present invention, the fibrous blanket 24 is made of fibers (preferably flame attenuated glass fibers) having an average diameter between $3.0 \times 10^{-5}$ and $3.7 \times 10^{-5}$ inches. The blanket 24 weighs between about 1.7 and about 2.7 grams per square foot and preferably, is substantially uniform in density and thickness throughout. The blanket 24 and the backing layer 34 which typically weighs about 1.3 grams per square foot, together, weigh between about 3.0 and 4.0 grams per square foot and have an average air filtration efficiency of at least 90% and preferably, about 95%. The initial pressure drop across the thickness of the blanket 24 and the backing layer 34 is no greater than 0.35 inches of water and preferably, no greater than 0.25 inches of water. Preferably, the blanket and the backing layer 34, together, range in thickness from about 0.08 to about 0.12 inches and typically, have a combined dust holding capacity of about 10 to about 12 grams/4 ft$^2$.

As discussed above, the blanket can be used as an air or gas filtration layer of the composite filtration media 20 without the permeable backing sheet 34. However, typically, the permeable backing sheet 34 is bonded to the downstream surface of the blanket, as shown in FIG. 1, to reinforce the blanket and give the blanket greater integrity. While the blanket is preferably made of glass fibers, polymeric or other fibers normally used in fibrous filtration media can also be used to form the blanket.

Figure 2:
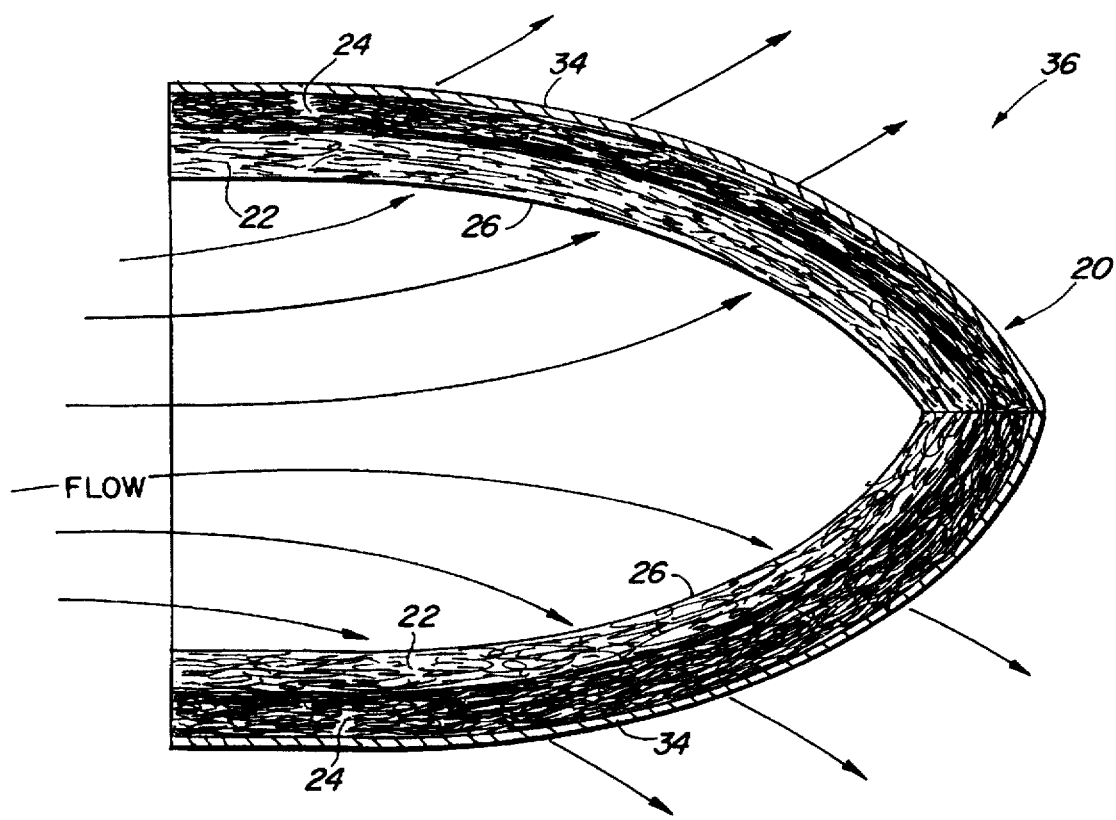
FIG. 2 is a cross section through a bag filter of the present invention made from the composite filtration media of the present invention.

FIG. 2 shows the composite filter media 20 of the present invention used in a pocket filter 36. As shown by the arrows, major stream components of the fluid being filtered pass through the upstream surface 26 of the composite filter media 20 both normal to the major surface and at acute angles to the major surface of the upstream layer 22 of the composite filter media. While shown in a pocket filter 36, the filtration media 20 of the present invention can be used to form other filters, including but not limited to, bag filters, flat sheet filters and the like.

While the composite filter media of the present invention is primarily intended for air and other gas filtration applications, the composite filter media 20 of the present invention can also be used to filter various types of liquids as well as gases and gaseous mixtures.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A composite fibrous filtration media, comprising:
   a first upstream layer of polymeric fibers; the first upstream layer comprising about 10% to about 60% by weight polymeric microfibers having a mean fiber diameter between about 2.5 and about 4.5 microns, about 25% to about 60% by weight polymeric loft fibers having a mean fiber diameter between about 4 and about 14 denier, and about 15% to about 30% by weight polymeric binder fibers having a mean diameter between about 2 and about 4 denier; the upstream layer having a weight between about 2.0 and about 7.0 grams per square foot; and
   a second downstream layer comprising a blanket of glass fibers bonded together at their points of intersection by a binder and bonded to the first upstream layer; the blanket having a weight between about 1.2 and about 2.7 grams per square foot; the glass fibers having an average fiber diameter within a range from $3.0 \times 10^{-5}$ to $4.1 \times 10^{-5}$ inches; and the blanket having an average air filtration efficiency of at least 80%.

2. The fibrous filtration media according to claim 1, wherein: the first upstream layer has an initial pressure drop across its thickness no greater than about 0.05 inches of water column; and the second downstream layer has an initial pressure drop across its thickness no greater than about 0.15 inches of water column.

3. The fibrous filtration media according to claim 1, wherein: the first upstream layer has an initial pressure drop across its thickness no greater than about 0.05 inches of water column; and the second downstream layer has an initial pressure drop across its thickness no greater than about 0.12 inches of water column.

4. The fibrous filtration media according to claim 1, wherein: the first upstream layer has an initial pressure drop across its thickness no greater than about 0.05 inches of water column and an average air filtration efficiency ranging from about 5% to about 20%; and the second downstream layer has an average air filtration efficiency of about 85% and an initial pressure drop across its thickness no greater than about 0.15 inches of water column.

5. The fibrous filtration media according to claim 4, wherein: the second downstream layer has an initial pressure drop across its thickness no greater than about 0.12 inches of water column.

6. The fibrous filtration media according to claim 1, wherein: the first upstream layer has an initial pressure drop across its thickness no greater than about 0.05 inches of water column and an average air filtration efficiency ranging from about 5% to about 20%; and the second downstream layer has an average air filtration efficiency of at least 90% and an initial pressure drop across its thickness no greater than about 0.35 inches of water column.

7. The fibrous filtration media according to claim 6, wherein: the second downstream layer has an initial pressure drop across its thickness no greater than about 0.25 inches of water column.

8. The fibrous filtration media according to claim 1, wherein: the first upstream layer has an initial pressure drop across its thickness no greater than about 0.05 inches of water column and an average air filtration efficiency ranging from about 5% to about 20%; and the second downstream layer has an average air filtration efficiency of about 95% and an initial pressure drop across its thickness no greater than about 0.35 inches of water column.

9. The fibrous filtration media according to claim 8, wherein: the second downstream layer has an initial pressure drop across its thickness no greater than about 0.25 inches of water column.

10. The fibrous filtration media according to claim 1, wherein: the polymeric microfibers are made of polypropylene; the polymeric loft fibers are made of a polymeric material selected from a group consisting of polypropylene and polyester; and the polymeric binder fibers have a polyester core with a polyolefin sheath.

11. The fibrous filtration media according to claim 10, wherein: the polymeric loft fibers have between about 10 and about 20 crimps per inch.

12. The fibrous filtration media according to claim 1, wherein: the first upstream layer comprises about 40% by weight polymeric microfibers, about 40% by weight polymeric loft fibers, and about 20% by weight polymeric binder fibers.

13. The fibrous filtration media according to claim 1, wherein: the polymeric microfibers have a mean diameter of about 3.5 microns, the polymeric loft fibers have a mean diameter of about 6 denier, and the polymeric binder fibers have a mean diameter of about 3 denier.

14. The fibrous filtration media according to claim 12, wherein: the polymeric microfibers have a mean diameter of about 3.5 microns, the polymeric loft fibers have a mean diameter of about 6 denier, and the polymeric binder fibers have a mean diameter of about 3 denier.

15. The fibrous filtration media according to claim 14, wherein: the first upstream layer has an initial pressure drop across its thickness no greater than about 0.05 inches of water column; and the second downstream layer has an initial pressure drop across its thickness no greater than about 0.15 inches of water column.

16. The fibrous filtration media according to claim 14, wherein: the first upstream layer has an initial pressure drop across its thickness no greater than about 0.05 inches of water column; and the second downstream layer has an initial pressure drop across its thickness no greater than about 0.12 inches of water column.

17. The fibrous filtration media according to claim 14, wherein: the first upstream layer has an initial pressure drop across its thickness no greater than about 0.05 inches of water column and an average air filtration efficiency ranging from about 5% to about 20%; and the second downstream layer has an average air filtration efficiency of about 85% and an initial pressure drop across its thickness no greater than about 0.15 inches of water column.

18. The fibrous filtration media according to claim 17, wherein: the second downstream layer has an initial pressure drop across its thickness no greater than about 0.12 inches of water column.

19. The fibrous filtration media according to claim 14, wherein: the first upstream layer has an initial pressure drop across its thickness no greater than about 0.05 inches of water column and an average air filtration efficiency ranging from about 5% to about 20%; and the second downstream layer has an average air filtration efficiency of at least 90% and an initial pressure drop across its thickness no greater than about 0.35 inches of water column.

20. The fibrous filtration media according to claim 19, wherein: the second downstream layer has an initial pressure drop across its thickness no greater than about 0.25 inches of water column.

21. The fibrous filtration media according to claim 14, wherein: the first upstream layer has an initial pressure drop across its thickness no greater than about 0.05 inches of water column and an average air filtration efficiency ranging from about 5% to about 20%; and the second downstream layer has an average air filtration efficiency of about 95% and an initial pressure drop across its thickness no greater than about 0.35 inches of water column.

22. The fibrous filtration media according to claim 21, wherein: the second downstream layer has an initial pressure drop across its thickness no greater than about 0.25 inches of water column.

23. The fibrous filtration media according to claim 14, wherein: the polymeric microfibers are made of polypropylene; the polymeric loft fibers are made of a polymeric material selected from a group consisting of polypropylene and polyester; and the polymeric binder fibers have a polyester core with a polyolefin sheath.

24. The fibrous filtration media according to claim 23, wherein: the polymeric loft fibers have between about 10 and about 20 crimps per inch.

25. A composite filter comprising:
  a first upstream layer of polymeric fibers; the first upstream layer comprising about 10% to about 60% by weight polymeric microfibers having a mean fiber diameter between about 2.5 and about 4.5 microns, about 25% to about 60% by weight polymeric loft fibers having a mean fiber diameter between about 4 and about 14 denier, and about 15% to about 30% by weight polymeric binder fibers having a mean diameter between about 2 and about 4 denier; the upstream layer having a weight between about 2.0 and about 7.0 grams per square foot; the first upstream layer having a major upstream surface adapted to be oriented relative to a gas flow being filtered so that a major component of the gas flow being filtered is directed at an acute angle to the major upstream surface; and
  a second downstream layer comprising a blanket of glass fibers bonded together at their points of intersection by a binder and bonded to the first upstream layer; the blanket having a weight between about 1.2 and about 2.7 grams per square foot; the glass fibers having an average fiber diameter within a range from $3.0 \times 10^{-5}$ to $4.1 \times 10^{-5}$ inches; and the blanket having an average air filtration efficiency of at least 80%.

26. The composite filter of claim 25, wherein: the composite filter is a bag filter.

27. The composite filter according to claim 25, wherein: the first upstream layer has an initial pressure drop across its thickness no greater than about 0.05 inches of water column; and the second downstream layer has an initial pressure drop across its thickness no greater than about 0.15 inches of water column.

28. The composite filter according to claim 25, wherein: the first upstream layer has an initial pressure drop across its thickness no greater than about 0.05 inches of water column; and the second downstream layer has an initial pressure drop across its thickness no greater than about 0.12 inches of water column.

29. The composite filter according to claim 25, wherein: the first upstream layer has an initial pressure drop across its thickness no greater than about 0.05 inches of water column and an average air filtration efficiency ranging from about 5% to about 20%; and the second downstream layer has an average air filtration efficiency of about 85% and an initial pressure drop across its thickness no greater than about 0.15 inches of water column.

30. The composite filter according to claim 29, wherein: the second downstream layer has an initial pressure drop across its thickness no greater than about 0.12 inches of water column.

31. The composite filter according to claim 25, wherein: the first upstream layer has an initial pressure drop across its thickness no greater than about 0.05 inches of water column and an average air filtration efficiency ranging from about 5% to about 20%; and the second downstream layer has an average air filtration efficiency of at least 90% and an initial pressure drop across its thickness no greater than about 0.35 inches of water column.

32. The composite filter according to claim 31, wherein: the second downstream layer has an initial pressure drop across its thickness no greater than about 0.25 inches of water column.

33. The composite filter according to claim 25, wherein: the first upstream layer has an initial pressure drop across its thickness no greater than about 0.05 inches of water column and an average air filtration efficiency ranging from about 5% to about 20%; and the second downstream layer has an average air filtration efficiency of about 95% and an initial pressure drop across its thickness no greater than about 0.35 inches of water column.

34. The composite filter according to claim 33, wherein: the second downstream layer has an initial pressure drop across its thickness no greater than about 0.25 inches of water column.

35. The composite filter according to claim 25, wherein: the polymeric microfibers are made of polypropylene; the polymeric loft fibers are made of a polymeric material selected from a group consisting of polypropylene and polyester; and the polymeric binder fibers have a polyester core with a polyolefin sheath.

36. The composite filter according to claim 35, wherein: the polymeric loft fibers have between about 10 and about 20 crimps per inch.

* * * * *